Aug. 7, 1962   E. W. HOWE   3,048,053
HELICAL CAM
Filed March 9, 1960
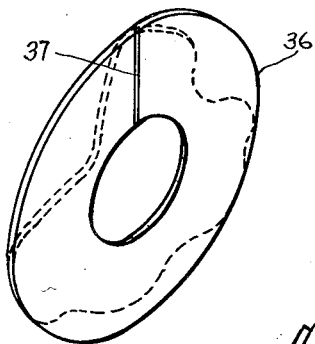
Fig.1.
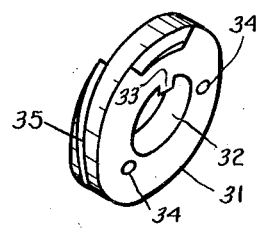
Fig.2.
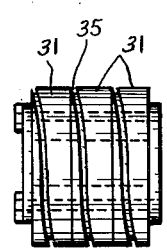
Fig.3.
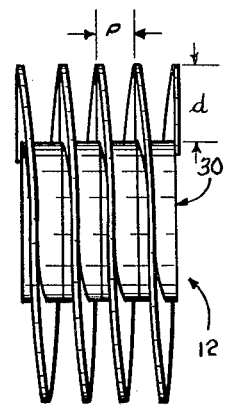
Fig.4.
Fig.5.
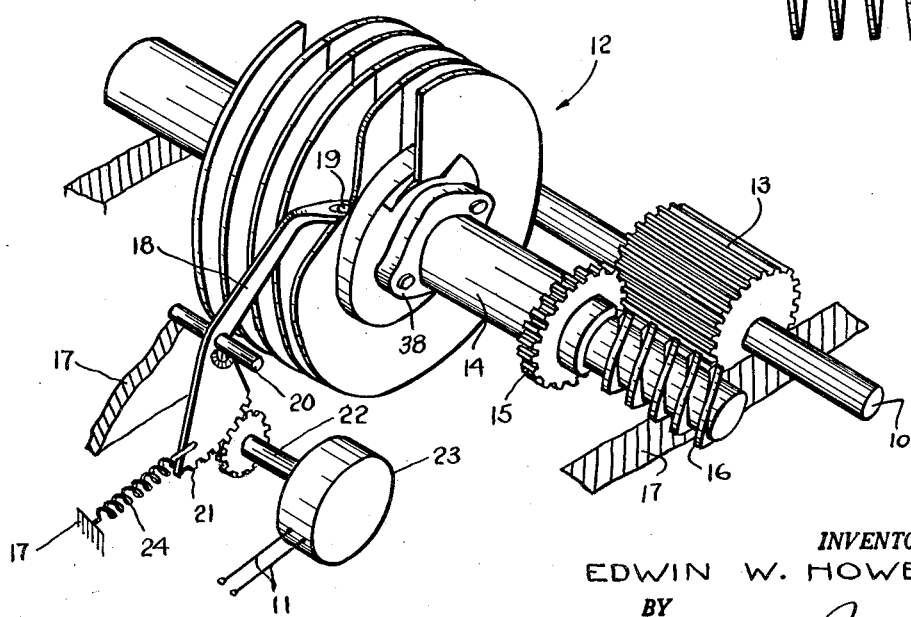
INVENTOR.
EDWIN W. HOWE
BY
Raymond A. Paquin
ATTORNEY.

ID Patented Aug. 7, 1962

**3,048,053
HELICAL CAM**
Edwin W. Howe, North Baldwin, N.Y., assignor to American Bosch Arma Corporation, a corporation of New York
Filed Mar. 9, 1960, Ser. No. 13,765
4 Claims. (Cl. 74—567)

The present invention relates to mechanical cams and has particular reference to the manufacture of helical cams.

A cam which operates with precision for a wide range of input values, such as a continuously driven cam whose output is a function of the time, usually requires an extremely long cam surface to assure high resolution of information. An extremely large diameter cam would provide this capability with obvious disadvantages. Also, tape cams have been used in which the cam function is performed by the edge of a mechanical tape which is driven from one reel to another.

The present invention uses a cam surface which has been built into the edge of a helical track for extended range. The helical track is made in one-turn sections for ease of assembly and for better control of tolerances which results in an economical, simple and precise helical cam. In the method here proposed, each section includes a hub, whose thickness is equal to the helical pitch, having cut thereon a single helical groove of the same pitch. A plate with a central circular hole and an outer periphery shaped to the cam track is threaded into the groove and then fastened to the hub. The sub-assembled sections are then stacked and attached to the cam shaft to complete the helical cam.

It is an object of this invention to produce a simply manufactured, economical, precise helical cam.

It is another object of this invention to produce a mechanical cam capable of ready change of output characteristic by interchange or substitution of individual sections of the cam.

It is an object of this invention to produce a helical cam in which the depth of the cam track is not limited by available cutting tools, but only by the size of the hub holding the helical cam to the cam shaft.

These and other objects will be made clear in the description which follows. For a better understanding of the invention, reference may be had to the accompanying diagrams, in which:

FIG. 1 shows a disk which forms one section of the helix;

FIG. 2 shows a hub which holds the disk of FIG. 1;

FIG. 3 illustrates one step in the manufacture of the hub;

FIG. 4 illustrates a portion of the assembled cam sections; and

FIG. 5 is a pictorial view of a device using the helical cam of this invention.

With reference now to the figures, identical parts in each of the various views are identified by the same number. FIG. 5 shows a cam in use, while the other figures show various degrees of completion and assembly of the cam.

Referring first to FIG. 5, a partial pictorial view of a device using the helical cam of this invention is shown. In this device, the relationship between the rotation of input shaft 10 and the electrical resistance across the output leads 11 is determined by the shape of the helical cam 12. The input shaft 10 rotates the spline gear 13 which in turn rotates the cam shaft 14 by means of the gear 15. Rotation of cam shaft 14 also effects longitudinal motion thereof by virtue of the screw threads 16 which are formed on one end of the shaft 14, and are received in a cooperative threaded member in the frame 17 of the device. The longitudinal motion of the cam shaft 14 is required to preclude relative axial motion between the helical cam 12 and cam follower 18 and thereby permits the follower 18 to remain in contact with the helical cam 12 during rotation of the helical cam 12. The cam follower 18 has a roller 19 which contacts the cam surface and is pivoted at a stationary pivot 20. The other end of the follower 18 is terminated in a sector gear 21, which through gear 22 adjusts the input shaft of the variable resistor 23. The spring 24 between follower 18 and frame 17 urges the roller 19 against cam 12.

The cam 12 is unique in its construction and is produced and assembled as described in relation to the first four figures. The cam 12 is assembled, as in FIG. 4, from a number of separate pieces such as shown in FIGS. 1 and 2. The cam of FIG. 4 has a pitch $p$ between the threads of the helix, and a depth $d$ between the outer circumference and the hub 30. The hub 30 is assembled from a number of similar annular rings or hub members 31, FIG. 2, which are made, as will be described, and then fastened together to form a unitary hub 30. The rings 31 are made substantially in the following manner:

First, thick disks are made, having a thickness equal to or slightly greater than the pitch $p$.

Then, the arbor hole 32 with key 33 and holes 34 are made by drilling and broaching to create the blank hub rings. These rings are then finished to a thickness exactly equal to the pitch $p$, within a specified tolerance, as by grinding for example.

Now, a number of the rings are assembled temporarily, FIG. 3, to form a cylinder, and a helical groove 35 is cut in the cylinder such that the pitch of the cut helix is also exactly equal to the pitch $p$. The start of the groove 35 is preferably referenced to the position of the key 33 to assist in future assembly.

The rings are now disassembled from their temporary unitary condition and are ready to receive the cam disks 36 into these helical grooves 35.

The disks 36 have their periphery cut to the desired cam curve, shown dotted on the full disk 36 in FIG. 1, and are cut through from the outer periphery to the inner circumference along the line 37 which may be radial but is not necessarily so. However, line 37 must be the same for all the disks. The pre-formed disk 36 is threaded into the groove 35 and is fixed to the ring 31 by any acceptable means such as by set screws or by welding, for example. The cut 37 of the disk 36 must be positioned at the same point of the groove 35 in each of the rings to insure subsequent mating of adjacent cam assemblies. For this reason, the cut 37 is preferably located with respect to the key 33 but other means to the same end may be employed, if desired. It should be realized at this time that the cam curves are calculated, as usual, for a specified direction of travel of the cam with respect to the follower. Therefore, the cam disks 36 must be properly oriented with respect to the hub rings 31 during assembly operations to maintain the required continuity of operation, as well as properly positioned. Reference markings to identify the surfaces of the rings 31 and the disk 36 which should coincide can be applied during earlier operations for preserving ease of assembly.

The composite disks-and-hubs are then stacked in the desired order and attached to the cam shaft 14, by means of machine screws, not shown, which pass through the entire length of the stacked hubs and are screwed into a flange 38 on the shaft 14, for example, or other suitable means.

The advantages of this type of construction now become clear. A helical cam of this type will find utility in certain automated test equipment for example, where the human reaction to changing parameters are recorded. In repeated tests of this type the test may be memorized by the subject and the test will lose its effectiveness. The cam of this invention is made up of a number of interchangeable sections. If these are so calculated that the value and slope of the cut 37 of each section are exactly equal to the value and slope of every other section, then the cam sections can be indiscriminately changed to present a different overall characteristic between the input and output. If there are five sections for example, there are over a hundred different characteristics which can be made simply by changing the sequence of the cam sections.

Another advantage of this construction is in the relative ease with which the cam tracks can be manufactured since it involves only a simple cutting operation on a flat sheet of metal. Also, because this cam track can be cut before the entire cam is assembled a deep cut, even up to the full depth $d$, can be made easily with precision.

In addition, by the method described it is possible to establish a very accurate cumulative dimension over an extended cam assembly, or over numerous groupings of lesser cam assemblies. This is imperative to assure that the cam followers remain in contact with the individual cams as the cams progress under the follower. The clearance required between the follower arm and the cams adjacent to that with which the follower is in contact is also assured throughout numerous rotations of the cams.

Since many minor modifications to the article and method described will occur to those skilled in the art, the description should not be considered as limiting the invention in any way. Accordingly, the invention is to be limited only to the spirit and scope of the appended claims.

I claim:

1. A helical cam comprising a plurality of hub members, each of said hub members having a helical groove, a plurality of cam plates, each plate comprising a split annular disc having a cam contour formed at the outer periphery, one of said cam plates being secured in each of said helical grooves, means for securing said hub members in stacked relation so that a split edge of each cam plate coincides with a split edge of the adjacent cam plate whereby a continuous cam contour is formed.

2. A helical cam comprising a plurality of similar hub members, each of said hub members having a helical groove therein, the thickness of said hub members being substantially equal to the pitch of said helical groove, a plurality of cam plates, each plate comprising a split annular disc having a cam contour formed at the outer periphery and an inner circular opening, one of said cam plates being located in each of said helical grooves and secured to said hub members, reference points on each of said hub members, each of said plates being similarly located with respect to said reference points, means for securing said hub members in stacked relation with said reference points in register.

3. A helical cam comprising a plurality of similar hub members, each of said hub members having a helical groove therein, the thickness of said hub members being substantially equal to the pitch of said helical groove, a plurality of cam plates, each plate comprising a split annular disc having a cam contour formed at the outer periphery and an inner circular opening, one of said cam plates being located in each of said helical grooves and secured to said hub members, reference points on each of said hub members, each of said plates being similarly located with respect to said reference points, means for securing said hub members in stacked relation whereby a split edge of each cam plate coincides with a split edge of the adjacent cam plate to form a continuous cam contour.

4. A helical cam comprising a plurality of hub members, each of said hub members having a helical groove, a plurality of cam plates, each plate comprising a split annular disc having a cam contour formed at the outer periphery, at least one of said cam plates being secured in each of said helical grooves, means for securing said hub members in stacked relation so that a split edge of each cam plate coincides with a split edge of the adjacent cam plate whereby a continuous cam contour is formed.

References Cited in the file of this patent

UNITED STATES PATENTS

| | | |
|---|---|---|
| 33,771 | Anderson | Nov. 26, 1861 |
| 171,908 | Abel | Jan. 11, 1876 |
| 854,056 | Richards | May 21, 1907 |
| 1,353,369 | Williams | Sept. 21, 1920 |
| 1,725,569 | Crook et al. | Aug. 20, 1929 |
| 2,411,874 | Golden | Dec. 3, 1946 |
| 2,460,024 | McKee | Jan. 25, 1949 |
| 2,506,814 | Sayre | May 9, 1950 |
| 2,573,638 | Bryant | Oct. 30, 1951 |
| 2,618,764 | Rieber | Nov. 18, 1952 |
| 2,704,395 | Heidegger | Mar. 22, 1955 |
| 2,836,991 | Perlis | June 3, 1958 |
| 2,874,584 | Ahlport | Feb. 24, 1959 |
| 2,916,807 | Christian | Dec. 15, 1959 |
| 2,932,983 | Laviana et al. | Apr. 19, 1960 |

FOREIGN PATENTS

| | | |
|---|---|---|
| 11,003 | France | Oct. 6, 1909 |
| 366,508 | Great Britain | Jan. 29, 1932 |